US008414028B2

(12) United States Patent
Miyajima et al.

(10) Patent No.: US 8,414,028 B2
(45) Date of Patent: Apr. 9, 2013

(54) SEATBELT DEVICE AND METHOD FOR ASSEMBLING THE SAME

(75) Inventors: Yoichi Miyajima, Hiroshima (JP); Hiroaki Takeshita, Hiroshima (JP)

(73) Assignee: Mazda Motor Corporation (JP)

( * ) Notice: Subject to any disclaimer, the term of this patent is extended or adjusted under 35 U.S.C. 154(b) by 214 days.

(21) Appl. No.: 13/024,143

(22) Filed: Feb. 9, 2011

(65) Prior Publication Data

US 2011/0241328 A1    Oct. 6, 2011

(30) Foreign Application Priority Data

Mar. 30, 2010   (JP) ................. 2010-078755

(51) Int. Cl.
  *B60R 22/46* (2006.01)
  *B60R 22/195* (2006.01)

(52) U.S. Cl. ........ 280/806; 280/807; 280/808; 297/474; 297/476; 297/479; 297/480

(58) Field of Classification Search ................... 297/468, 297/474–479, 480; 280/803, 807–808, 806
See application file for complete search history.

(56) References Cited

U.S. PATENT DOCUMENTS

| 4,079,964 | A | * | 3/1978 | Yamada et al. | 280/807 |
| 4,284,294 | A | * | 8/1981 | Takada | 280/803 |
| 4,315,639 | A | * | 2/1982 | Booth et al. | 280/803 |
| 4,531,762 | A | * | 7/1985 | Sasaki et al. | 280/801.1 |
| 4,546,998 | A | * | 10/1985 | Suzuki et al. | 280/807 |
| 5,014,927 | A | * | 5/1991 | Ogawa et al. | 242/613.2 |
| 5,031,933 | A | * | 7/1991 | Hirasawa et al. | 280/808 |
| 5,044,459 | A | * | 9/1991 | Nishikaji | 180/268 |
| 5,411,319 | A | * | 5/1995 | Kuiri | 297/483 |
| 6,769,716 | B2 | * | 8/2004 | Rouhana et al. | 280/806 |

FOREIGN PATENT DOCUMENTS

JP       11-198757        7/1999

* cited by examiner

*Primary Examiner* — Ruth Ilan
*Assistant Examiner* — James English
(74) *Attorney, Agent, or Firm* — Studebaker & Brackett PC; Donald R. Studebaker

(57) ABSTRACT

A seatbelt device comprises a seatbelt including a shoulder belt to restrain a passenger's upper body and a lap belt to restrain a passenger's waist portion, a tongue fixed to the seatbelt and parting the seatbelt into the shoulder belt and the lap belt, a first retractor fixed to a pillar and coupled to a tip of the shoulder belt, a second D ring attached to a position of an inner panel of a side sill below the pillar and supporting the lap belt so as to let the lap belt slide therein, and a second retractor fixed to another position of the inner panel of the side sill located in front of the second D ring and below a seat slide rail, the second retractor being coupled to a tip of the lap belt.

7 Claims, 3 Drawing Sheets

SEATBELT DEVICE AND METHOD FOR ASSEMBLING THE SAME

BACKGROUND OF THE INVENTION

The present invention relates to a seatbelt device and a method of assembling the same, and in particular, relates to a seatbelt device which comprises a seatbelt to which a tongue parting the seatbelt into a shoulder belt and a lap belt is fixed.

Conventionally, the seatbelt device which is equipped with the tongue fixed to the seatbelt so that tensions applied to the lap belt and the shoulder belt can be adjusted separately is known as disclosed in Japanese Patent Laid-Open Publication No. 11-198757, for example. In this seatbelt device, in order to improve the amount of withdrawal and the operation of the lap belt and the shoulder belt, a retractor for lap belt with a lock mechanism is provided at a tip of the lap belt in addition to a retractor for shoulder belt with a lock mechanism which is provided at a tip of the shoulder belt. Further, according to the seatbelt device disclosed in this patent document, the retractor for shoulder belt and the retractor for lap belt are fixed to the center pillar of the vehicle body.

The seatbelt device disclosed in the above-described patent document, however, had a problem. That is, both the retractor for shoulder belt and the retractor for lap belt are fixed to the center pillar, so that in case the lock mechanisms of the retractors operate in a vehicle collision, forces transmitting via the shoulder belt and the retractor for shoulder belt and the lap belt and the retractor for lap belt may concentrate on the center pillar improperly.

SUMMARY OF THE INVENTION

The present invention has been devised in view of the above-described problem, and an object of the present invention to provide a seatbelt device or a method for assembling a seatbelt device which can prevent the improper concentration of the forces on the center pillar.

According to the present invention, there is provided a seatbelt device which restrains a passenger seated in a seat which is provided so as to slide on a seat slide rail extending in a vehicle longitudinal direction, comprising a seatbelt including a shoulder belt to restrain an upper body of the passenger and a lap belt to restrain a waist portion of the passenger, a tongue fixed to the seatbelt and parting the seatbelt into the shoulder belt and the lap belt, a first retractor fixed to a pillar of a vehicle body and coupled to a tip of the shoulder belt of the seatbelt, a support member attached to a specified position of an inner panel of a side sill of the vehicle body which is located below the pillar and supporting the lap belt so as to let the lap belt slide therein, and a second retractor fixed to another specified position of the inner panel of the side sill which is located in front of the support member and below the seat slide rail, the second retractor being coupled to a tip of the lap belt of the seatbelt.

According to the seatbelt device of the present invention, the second retractor is fixed to the side sill which has a relatively hard rigidity and is different from the pillar to which the first retractor is fixed, so that the forces applied to the first retractor and the second retractor in the vehicle collision can be transmitted separately to both the pillar and the side sill. Thereby, the support rigidity of the seatbelt device by the vehicle body can be increased properly.

According to an embodiment of the present invention, the seatbelt device further comprises a support bracket to support the seat slide rail, wherein the support bracket is joined to the inner panel of the side sill, the specified position of the support member fixed to the inner panel of the side sill is located in back of the support bracket, and the support bracket includes a through portion to pass the lap belt which extends from the support member to the second retractor therein. Thereby, the lap belt can be provided so as to extend from the support member toward the second retractor, passing through the through portion formed at the seat slide rail. Accordingly, even if the second retractor is arranged below the seat slide rail, the lap belt can be prevented from interfering with other members.

According to another embodiment of the present invention, the seat slide rail is supported by the support bracket so that the seat slide rail slants with a front end thereof which is located above the level of a rear end thereof. Thereby, a relatively large space can be secured below the seat slide rail, so that a space for arranging the relatively-large sized second retractor can be secured.

According to another embodiment of the present invention, the second retractor comprises a lock mechanism to restrict withdrawal of the lap belt in a vehicle collision. Thereby, the withdrawal of the lap belt can be restricted by the lock mechanism in the vehicle collision, so that the passenger can be protected properly.

According to another embodiment of the present invention, the second retractor comprises a pre-tensioner to apply a tension to the lap belt when a vehicle collision is predicted. Thereby, the tension can be applied to the lap belt by the pre-tensioner of the second retractor when the vehicle collision is predicted, so that the passenger can be protected properly.

Further, according to the present invention, there is provided a method for assembling a seatbelt device which restrains a passenger seated in a seat which is provided so as to slide on a seat slide rail extending in a vehicle longitudinal direction, comprising steps of preparing a seatbelt including a shoulder belt to restrain an upper body of the passenger and a lap belt to restrain a waist portion of the passenger, a tongue fixed to the seatbelt and parting the seatbelt into the shoulder belt and the lap belt, a first retractor coupled to a tip of the shoulder belt, and a second retractor coupled to a tip of the lap belt, fixing the first retractor to a pillar of a vehicle body, attaching a support member supporting the lap belt so as to let the lap belt slide therein to a specified position of an inner panel of a side sill of the vehicle body which is located below the pillar, fixing a second retractor to another specified position of the inner panel of the side sill which is located in front of the support member and below the seat slide rail, and joining a support bracket supporting the seat slide rail and including a through portion to pass the lap belt which extends from the support member to the second retractor therein to the inner panel of the side sill.

According to the method of assembling the seatbelt device of the present invention, the lap belt extending from the support member to the second tractor can be had pass in the through portion of the support bracket in case the first retractor is fixed to the pillar and the second retractor is fixed to the side sill. Accordingly, the seatbelt device can be assembled easily without any interference of the lap belt with other members.

Other features, aspects, and advantages of the present invention will become apparent from the following description which refers to the accompanying drawings.

DETAILED DESCRIPTION OF THE INVENTION

Figure 1:
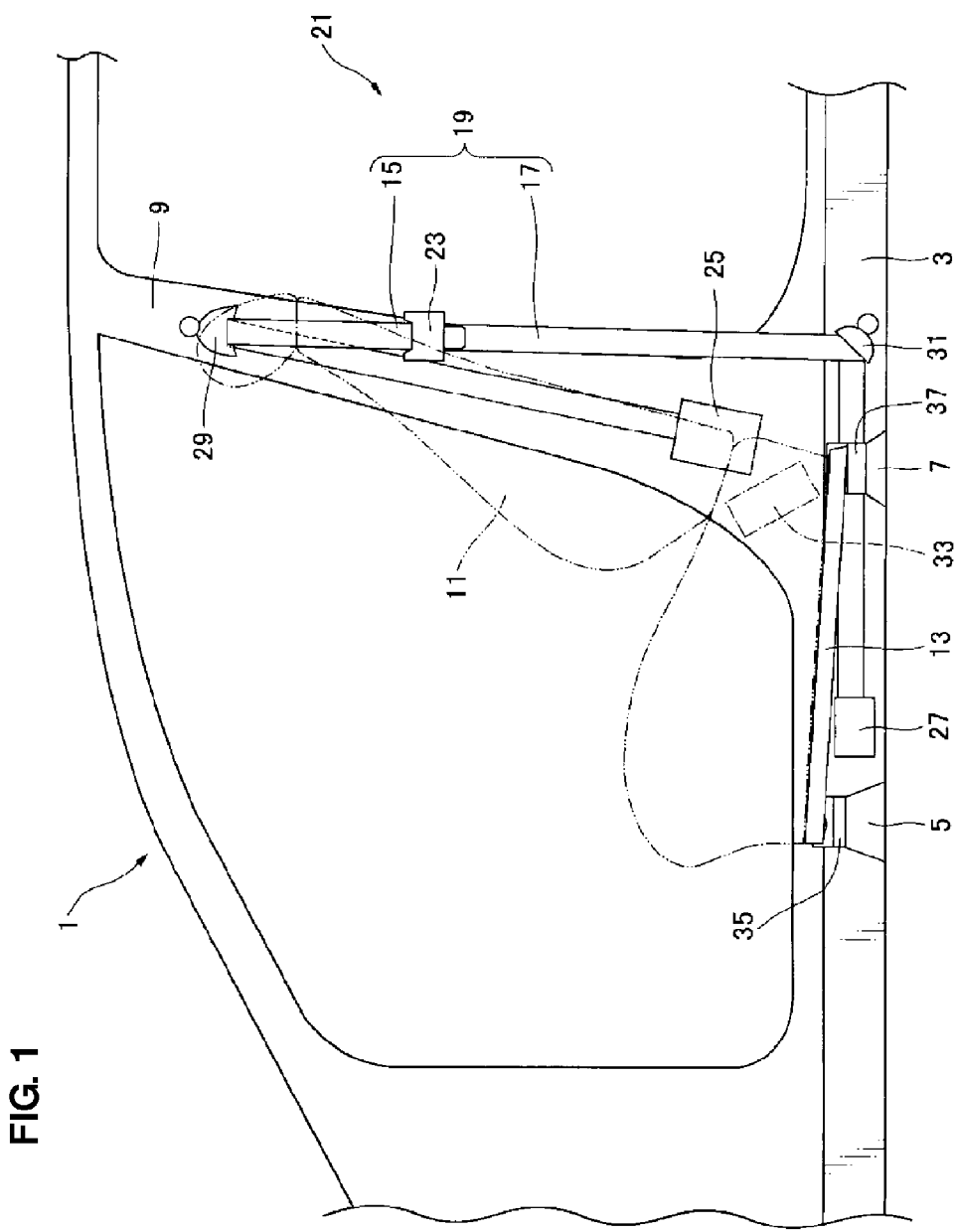
FIG. 1 is a side view of a vehicle compartment of a vehicle equipped with a seatbelt device according to an embodiment of the present invention.
Figure 2:
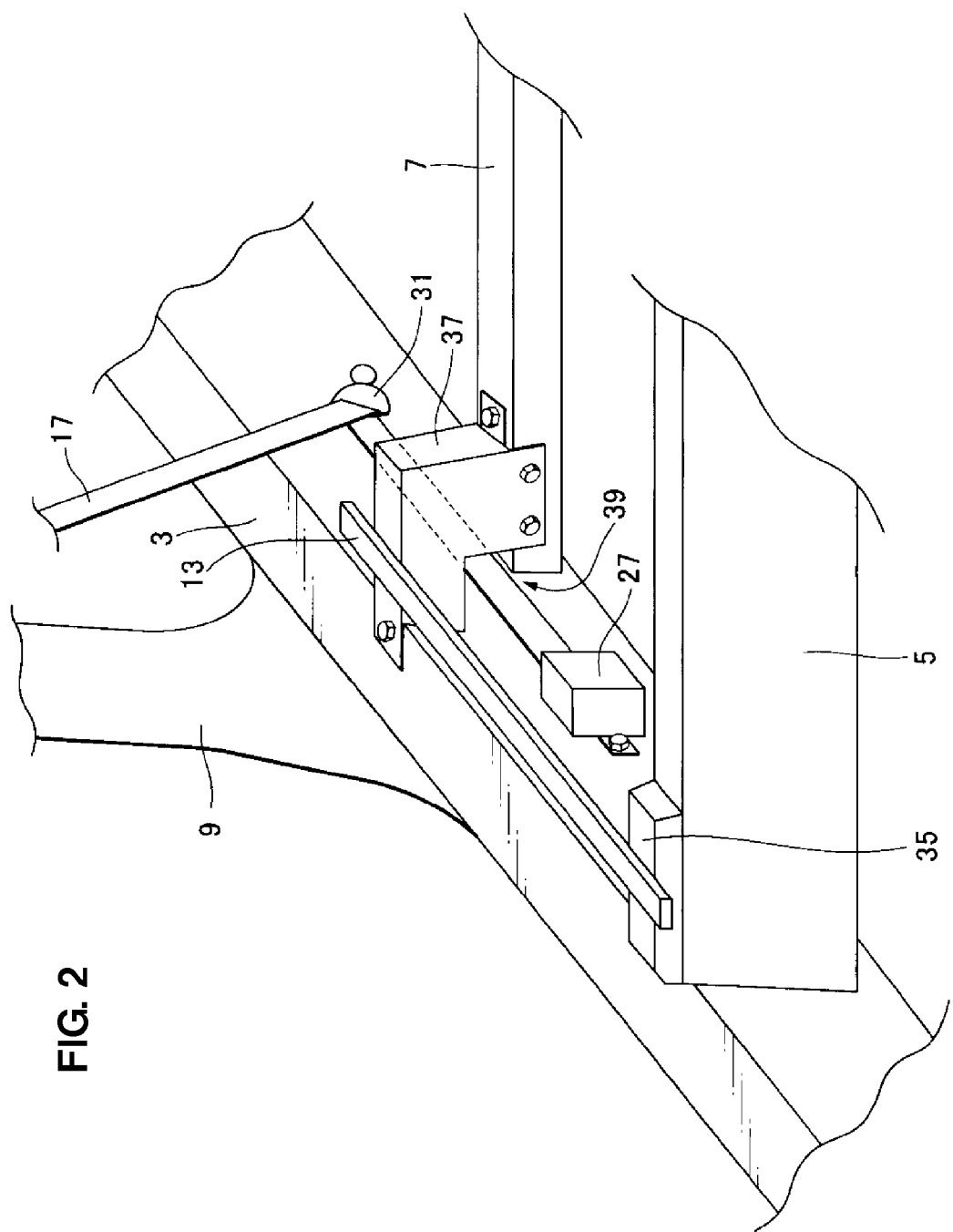
FIG. 2 is a perspective view of a lower portion of the seatbelt device according to the embodiment of the present invention, when viewed from a vehicle front side.

Hereinafter, a seatbelt device according to a preferred embodiment of the present invention will be descried referring to the accompanying drawings. FIG. 1 is a side view of a vehicle compartment of a vehicle equipped with a seatbelt device according to the embodiment of the present invention. FIG. 2 is a perspective view of a lower portion of the seatbelt device, when viewed from a vehicle front side.

As shown in FIGS. 1 and 2, a vehicle 1 comprises a pair of side sills 3 which extends in a vehicle longitudinal direction at its both-side end portions and is comprised of an inner panel and an outer panel which are joined, a No. 2 cross member 5 and a No. 2.5 cross member 7 which interconnect the both side sills and extend in a vehicle width direction, respectively, and a pair of center pillars 9 which extends vertically from the pair of side sills 3 at a central portion, in the vehicle longitudinal direction, of the vehicle 1. A front seat 11 for sitting of a passenger is provided on the No. 2 cross member 5 and the No. 2.5 cross member 7. The front seat 11 is arranged on a pair of seat slide rails 13 which extends in the vehicle longitudinal direction so as to slide longitudinally on the seat slide rails 13.

Further, the vehicle 1 comprises a seatbelt device 21, which is equipped with a seatbelt 19 which includes a shoulder belt 15 to restrain an upper body of the passenger seated in the front seat 11 and a lap belt 17 to restrain a waist portion of the passenger.

The seatbelt device 21 comprises the seatbelt 19 including the shoulder belt 15 and the lap belt 17, a tongue 23 which is fixed to the seatbelt 19, a first retractor 25 and a second retractor 27 which are respectively coupled to tips of the seatbelt 19, a first D ring 29 for letting the shoulder belt 15 slide therein, and a second D ring 31 for letting the lap belt 17 slide therein.

The first retractor 25 is coupled to a tip of the shoulder belt 15 so as to wind up the shoulder belt 15 of the seatbelt 19. This first retractor 25 is fixed to a lower portion of the center pillar 9. Further, the first D ring 29 is fixed to an upper portion of the center pillar 9. The shoulder belt 15 extends upwardly along the center pillar 9 from the first retractor 25, returns from the first D ring 29 which is attached to the center pillar 9, and then extends downwardly from the first D ring 29.

The tongue 23 is fixed to the seatbelt 19 and parts the seatbelt 19 into the shoulder belt 15 and the lap belt 17. Meanwhile, a buckle 33 which is detachable from the tongue 23 is provided on a vehicle inside of the front seat 11.

The second retractor 27 is coupled to a tip of the lap belt 17 of the seatbelt 19 so as to wind up the lap belt 17. The second retractor 27 is fixed to the side sill 3 below the front seat 11. Further, the second ring 31 is attached to the inner panel of the side sill 3 below the center pillar 9 which is located in back of the second retractor 27. The second D ring 31 is pivotally attached to the side sill 3 of the vehicle body. The second D ring 31 has an opening to let the lap belt 17 pass therein, and the second D ring 31 supports the lap belt 17 so that the lap belt 17 slides in its opening. The lap belt 17 extends from the tongue 23 to the second D ring 31, and then extends forwardly to the second retractor 27, passing through the second D ring 31.

The seatbelt 21 comprises a first support bracket 35 and a second support bracket 37 which support the seat slide rail 13. The first support bracket 35 is joined onto the No. 2 cross member 5 via bolt fastening, and the second support bracket 37 is joined onto the No. 2.5 cross member 7 via bolt fastening. Outside portions of the first support bracket 35 and the second support bracket 37 are joined to the inner panel of the side sill 3 via bolt fastening. Herein, the upper face of the first support bracket 35 provided on the vehicle forward side is located above the level of the upper face of the second support bracket 37 provided on the vehicle rearward side. The first support bracket 35 and the second support bracket 37 support the seat slide rail 13 so that the seat slide rail 13 slants with its front end which is located above the level of its rear end.

The second support bracket 37 has a notch 39 to let the lap belt 17 of the seatbelt device 21 pass therein. This notch 39 constitutes a through portion to pass the lap belt 17 of the seatbelt device 21 longitudinally. This through portion is formed along the inward face of the inner panel of the side sill 3 of the vehicle body so that its vertical length is longer than the width of the lap belt 17. The lap belt 17 having passed through the second D ring 31 extends forwardly, passing through the notch 39 of the second support bracket 37, to the second retractor 27 which is provided in front of the second D ring 31.

Figure 3:
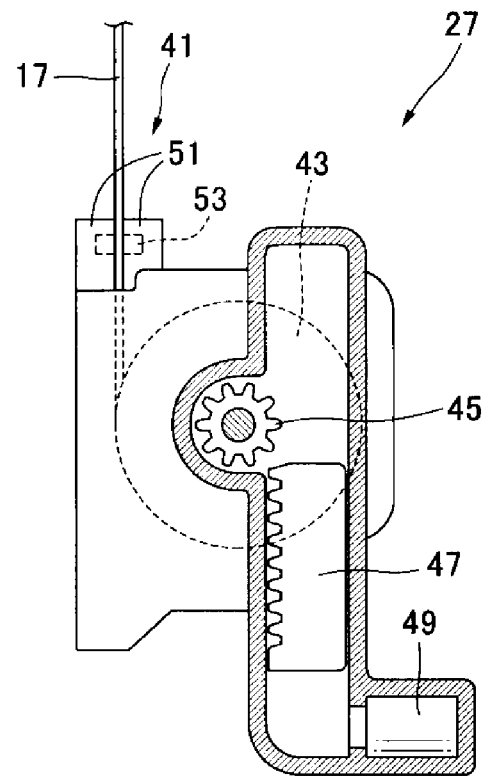
FIG. 3 is a sectional view showing a second retractor according to the embodiment of the present invention.

FIG. 3 is a sectional view showing the second retractor 27. As shown in this figure, the second retractor 27 comprises a lock mechanism 41, a winding-up reel 43 which winds up the lap belt 17, a pinion gear 45 which is coupled to a drive shaft of the winding-up reel 43, a rack gear 47 which engages with the pinion gear 45, and an inflator 49 which drives the rack gear 47.

The lock mechanism 41 restrains withdrawal of the lap belt 17 in a vehicle collision. This lock mechanism 41 comprises catching members 51 which catch the lap belt 17 therein and a solenoid 53 which drives the catching members 51.

The winding-up reel 43, the pinion gear 45, the rack gear 47 and the inflator 49 of the second retractor 27 constitutes a pre-tensioner which applies a tension to the lap belt 17 when the vehicle collision is predicted. The rack gear 47 and the pinion gear 45 of the pre-tensioner are operated with engagement by an ignition operation of the inflator 49, so that the pinion gear 45 drives the reel 43 in a direction of winding up the lap belt 17, resulting in applying the tension to the lap belt 17. Herein, this second retractor 27 may comprise either the lock mechanism 41 or the pre-tensioner.

Figure 4:
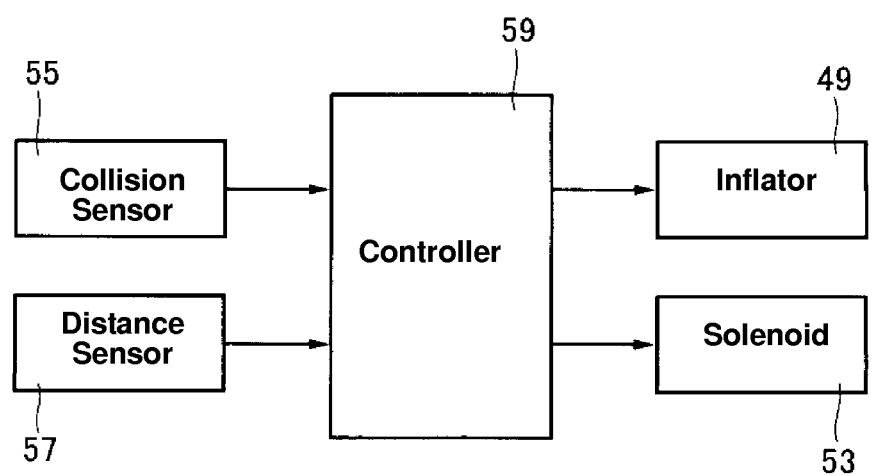
FIG. 4 is a block diagram showing a control system of the seatbelt device according to the embodiment of the present invention.

FIG. 4 is a block diagram showing a control system of the seatbelt device. As shown in FIG. 4, the control system of the seatbelt device comprises a collision sensor 55 which is comprised of an acceleration sensor to detect the vehicle collision and a distance sensor 57 which detects the distance between the vehicle and an obstacle located in front of the vehicle. These collision sensor 55 and distance sensor 57 are coupled to a controller 59, and respective detective results of these sensors are inputted to the controller 59.

The distance sensor 57 comprises a transmitter to transmit detection waves (infrared rays, millimeter waves, or the like) forwardly and a receiver to receive reflective waves of the detection waves from the obstacle. The time from the timing of transmission of the detection waves to the timing of receiving the reflected waves is measured, so that the distance between the vehicle and the obstacle in front of the vehicle is detected by this sensor 57.

The controller 59 determines the likelihood of the vehicle collision according to the distance between the vehicle and the obstacle which is detected by the distance sensor 57. When the controller 59 predicts the vehicle collision in case of determining that the obstacle approaches within a specified distance from the vehicle, an ignition signal is supplied to the inflator 49 of the second retractor 27, thereby operating the above-described pre-tensioner. Thus, the tension is applied to the lap belt 17. Or the controller 59 drives the solenoid 53 of the lock mechanism 41 in the vehicle collision so that the lap belt 17 can be locked.

Next, the method for assembling the seatbelt device 21 to the vehicle body will be described. In case of assembling the seatbelt device 21 to the vehicle body, at first the first retractor 25, the second retractor 27 and the two D rings 29, 31 are attached, and then the seatbelt 19 with the tongue 23 is prepared and attached to the vehicle body. Herein, the first retractor 25 is fixed to the lower portion of the center pillar 9, the first D ring 29 is attached to the upper portion of the center pillar 9, and the second D ring 31 is attached to the inner panel of the side sill 3 below the center pillar 9. Further, the second retractor 27 is fixed to the inner panel of the side sill 3 at a position which is located in front of the second D ring 31. Thus, the second retractor 27 is fixed to the side sill 3 between the two cross members 5, 7. The two support brackets 35, 37 are positioned onto the two cross members 5, 7 and joined to the cross members 5, 7 with bolts. Herein, the lap belt 17 of the seatbelt device 21 is provided so as to pass in the through portion of the notch 39 formed at the second support bracket 37. The seat slide rail 13 is attached onto the two support brackets 35, 37, and the seat 11 is attached onto the seat slide rail 13. Herein, the first support bracket 35 may be joined to the No. 2 cross member 5 by welding.

As described above, the seatbelt device 21 is assembled to the vehicle body by attaching the two support brackets 35, 37 after attaching the seatbelt 19 to the vehicle body. Accordingly, a relatively large space for the relatively large-sized second retractor 27 can be ensured and arranged in a space between the seat slide rail 13 and a floor without interfering with other members.

Hereinafter, the operation of the above-described seatbelt device will be described.

When the vehicle collision is predicted by the controller 59, the controller 59 supplies the ignition signal to the inflator 49 and operates the inflator 49. Thereby, the rack gear 47 and the pinion gear 45 are engaged with each other, and the winding-up reel 43 applies the tension to the lap belt 17. Accordingly, a restraint force is applied to the passenger's waist portion, so that the passenger's body can be prevented from moving forwardly.

Or when the controller 59 detects the vehicle collision, the lock mechanism 41 is operated by the controller 59 and thereby the lap belt 17 is locked. Thus, the withdrawal of the lap belt 17 is restricted. In case the passenger is forced to move forwardly due to the inertia in the vehicle collision, the tensions are applied to the shoulder belt 15 and the lap belt 17. In this case, the tension applied to the lap belt 17 is received by the second retractor 27 fixed to the side sill 3 by way of the second D ring 31. Meanwhile, the tension applied to the shoulder belt 15 is received by the first retractor 25 fixed to the center pillar 9 by way of the first D ring 29. As descried above, according to the seatbelt device 21 of the embodiment of the present invention, the tension applied to the seatbelt 19 can be dispersedly transmitted to the side sill 3 and the center pillar 9.

The present invention should not be limited to the above-described embodiment, and any other modifications and improvements may be applied within the scope of a sprit of the present invention. For example, while the normal belt-shaped seatbelt 19 is used in the above-described embodiment, the present invention is applicable to a seatbelt device in which the tongue is fixed and an air belt inflatable with gas is provided.

What is claimed is:

1. A seatbelt device which restrains a passenger seated in a seat which is provided so as to slide on a seat slide rail extending in a vehicle longitudinal direction, comprising:
    a seatbelt including a shoulder belt to restrain an upper body of the passenger and a lap belt to restrain a waist portion of the passenger;
    a tongue fixed to the seatbelt and parting the seatbelt into the shoulder belt and the lap belt;
    a first retractor fixed to a pillar of a vehicle body and coupled to a tip of the shoulder belt of the seatbelt;
    a support member attached to a specified position of an inner panel of a side sill of the vehicle body which is located below the pillar and supporting the lap belt so as to let the lap belt slide therein;
    a second retractor fixed to another specified position of the inner panel of the side sill which is located in front of the support member and below the seat slide rail, the second retractor being coupled to a tip of the lap belt of the seatbelt; and
    a support bracket to support the seat slide rail;
    wherein the support bracket is joined to the inner panel of the side sill, said specified position of the support member fixed to the inner panel of the side sill is located in back of the support bracket, and the support bracket includes a through portion to pass the lap belt which extends from the support member to said second retractor therein.

2. The seatbelt device of claim 1, wherein the seat slide rail is supported by said support bracket so that the seat slide rail slants with a front end thereof which is located above the level of a rear end thereof.

3. The seatbelt device of claim 1, wherein said second retractor comprises a lock mechanism to restrict withdrawal of the lap belt in a vehicle collision.

4. The seatbelt device of claim 2, wherein said second retractor comprises a lock mechanism to restrict withdrawal of the lap belt in a vehicle collision.

5. The seatbelt device of claim 1, wherein said second retractor comprises a pre-tensioner to apply a tension to the lap belt when a vehicle collision is predicted.

6. The seatbelt device of claim 2, wherein said second retractor comprises a pre-tensioner to apply a tension to the lap belt when a vehicle collision is predicted.

7. A method for assembling a seatbelt device which restrains a passenger seated in a seat which is provided so as to slide on a seat slide rail extending in a vehicle longitudinal direction, comprising steps of:
    preparing a seatbelt including a shoulder belt to restrain an upper body of the passenger and a lap belt to restrain a waist portion of the passenger, a tongue fixed to the seatbelt and parting the seatbelt into the shoulder belt and the lap belt, a first retractor coupled to a tip of the shoulder belt, and a second retractor coupled to a tip of the lap belt:
    fixing the first retractor to a pillar of a vehicle body;
    attaching a support member supporting the lap belt so as to let the lap belt slide therein to a specified position of an inner panel of a side sill of the vehicle body which is located below the pillar;

fixing a second retractor to another specified position of the inner panel of the side sill which is located in front of the support member and below the seat slide rail; and joining a support bracket supporting the seat slide rail and including a through portion to pass the lap belt which extends from the support member to the second retractor therein to the inner panel of the side sill.

* * * * *